March 10, 1959

G. R. LUCAS 2,877,049

ARM REST

Filed Oct. 30, 1957

George R. Lucas
INVENTOR.

BY *Clarence A. O'Brien
and Harvey B. Jacobson*
Attorneys

March 10, 1959 G. R. LUCAS 2,877,049
ARM REST
Filed Oct. 30, 1957
2 Sheets-Sheet 2
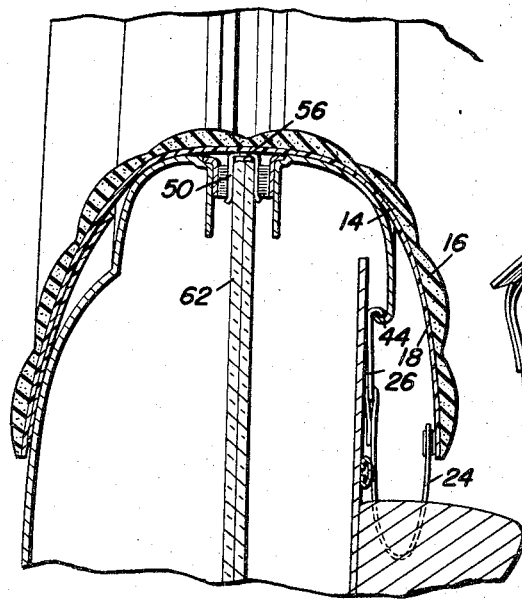
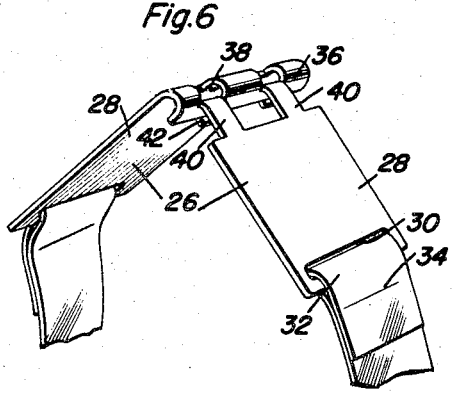
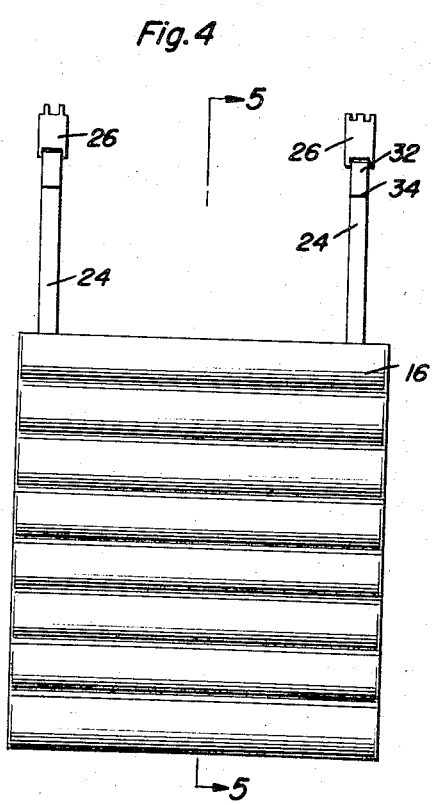
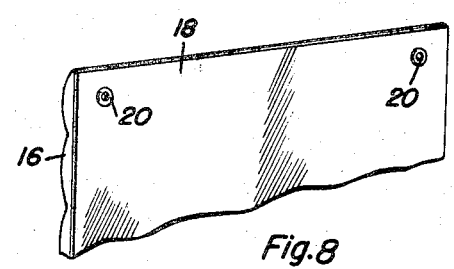
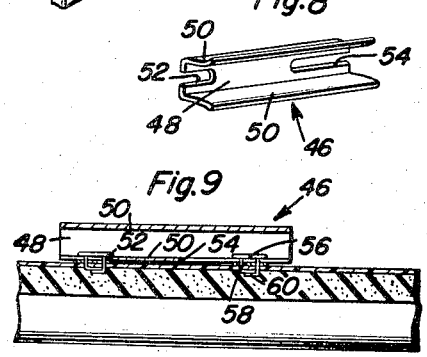
George R. Lucas
INVENTOR.

United States Patent Office 2,877,049
Patented Mar. 10, 1959

2,877,049

ARM REST

George R. Lucas, Detroit, Mich.

Application October 30, 1957, Serial No. 693,341

5 Claims. (Cl. 296—49.2)

This invention relates generally to an attachment for vehicles, and more specifically to an arm rest for automobiles.

The primary object of this invention is to provide an arm rest for automobiles, which may be used to cover the window frame in an automobile door, where motorists and passengers usually lean their arms. This arm rest will provide a protective surface between the window frame, which sometimes becomes very hot in the sun, and the skin of a motorist or passenger.

Another object of this invention is to provide an arm rest for an automobile, which may be conveniently attached to the door of an auto, and depend therefrom, the back of this arm rest having a pocket therein, so that when in a depending position the pocket will be available to passengers of the automobile.

A further object of this invention is to provide an arm rest for automobiles, wherein the arm rest has means thereon for locating the arm rest in position at the base of a window frame in an automobile door, in a predetermined position with respect to the upper edge of the window of the automobile.

A still further object of this invention is to provide an arm rest for vehicles, which may be easily detached from the door of the vehicle, and hooked about the waist of a user and thus used as a cushion for picnics and other outdoor activities.

An even further object of the invention is to produce a simple and inexpensive device and yet one which will be exceedingly effective for the purpose for which it is designed.

These together with other objects and advantages which will become subsequently apparent reside in the details of construction and operation as more fully hereinafter described and claimed, reference being had to the accompanying drawings, forming a part hereof, wherein like numerals refer to like parts throughout, and in which:

Figure 3 is an enlarged vertical sectional view taken substantially through the arm rest in the position shown in Figure 2;

Figure 4 is an elevational plan view of the arm rest as it would appear when placed on a flat surface;

Figure 6 is an enlarged perspective view illustrating the fasteners to be used with the present invention;

Figure 7 is a perspective view of a portion of the back of the arm rest, illustrating the location of the snap fasteners;

Figure 8 is a perspective view of the channel-like hooks to be used for engaging the upper edge of a window; and Figure 9 is a horizontal sectional view taken substantially through the device along the clips, as illustrated in the position shown in Figure 1.

Figure 1:
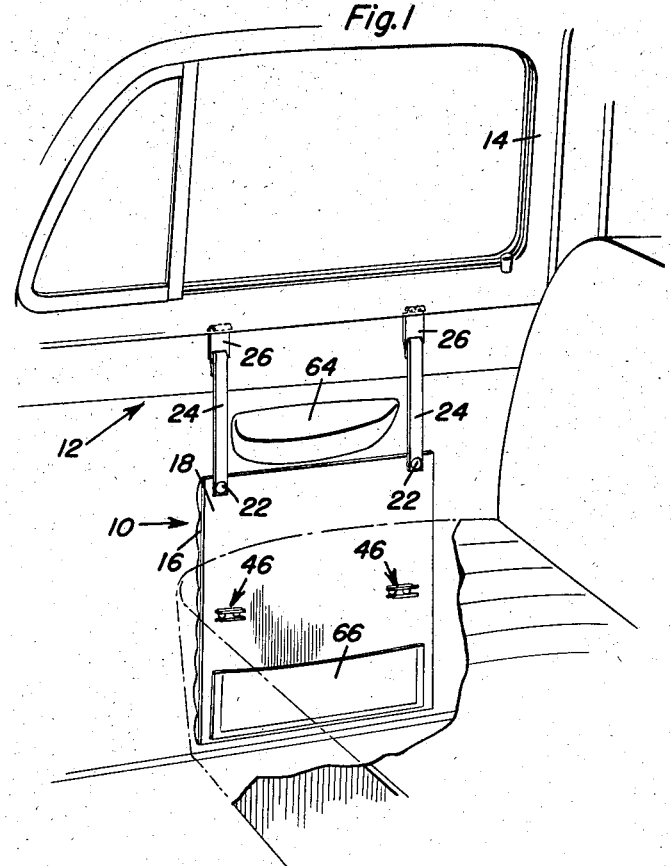
Figure 1 is a perspective view of the arm rest illustrating its use as attached to the inside of an automobile door, and being used as a pocket rather than as an arm rest.

Referring now more specifically to the drawings, the numeral 10 generally designates the arm rest comprising the present invention. The arm rest is illustrated as connected to an automobile door 12, having a window frame 14 therein.

The arm rest proper 10, is constructed of a sponge rubber scalloped body of generally rectangular shape 16, having a backing 18 fixed thereto.

Near the upper end of the back 18 are two halves 20 of a snap fastener set. The other parts of the snap fasteners 22 are connected to the lower ends of a pair of yieldable straps 24, which have fastening elements 26 connected to the upper ends thereof. Fasteners 26 are composed of flat generally rectangular plates 28, having slots 30 formed in the lower edges thereof, for accommodating yielding straps 24. The straps 24 are passed through slots 30 and then folded back on themselves so as to form a loop 32, and are stitched in position by means of stitching 34. There are two plates 28, each having a different type construction on the upper end thereof. On one of the plates 28, the upper end is bent back in a smooth curve to form an open hook portion 36, so that the hook 36 and plate 28, are generally J-shaped. There are two notched out portions 38 in the hook 36, which will be used for a purpose to be described below. The other plate 28 has two projections 40, which are bent into hooks 42, similarly to hook portion 36 of the other plate. The two hooks 42 will thus be received in the slots 38 and hooked over the material of the hook 36 which lies beyond one end of the slots 38, as shown in Figure 6. If the two fasteners are hooked together as illustrated in Figure 6, it may be seen that the straps 24 may be passed about a user's waist with the fasteners being located in the front, and the arm rest may be used as a seat for picnics or other outdoor events, when chairs or other type of seats are not available.

Figure 2:
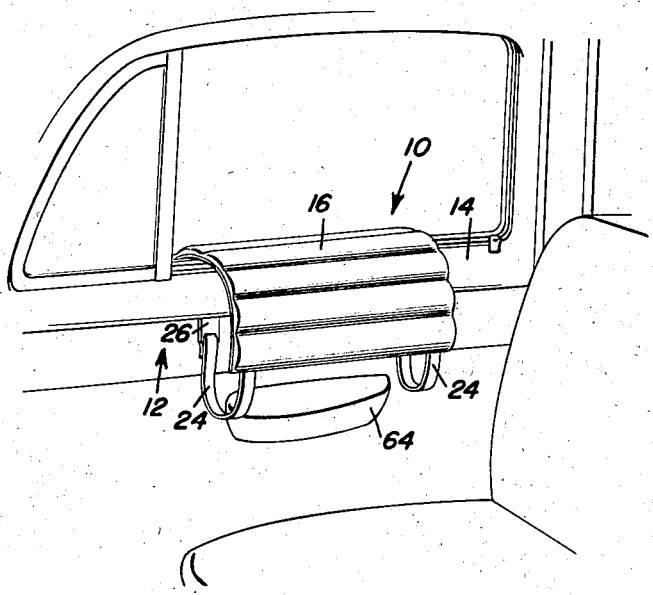
Figure 2 is a perspective view similar to Figure 1 and illustrating the arm rest in proper position for its intended use.
Figure 5:
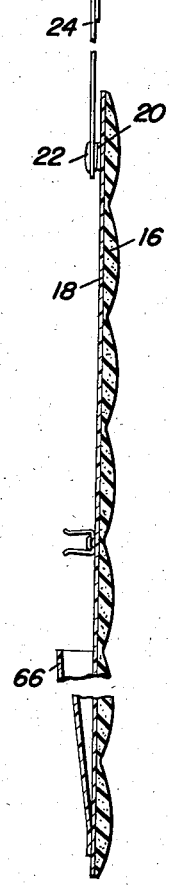
Figure 5 is a vertical sectional view taken substantially along the plane difined by reference line 5—5 of Figure 4, illustrating details of construction thereof.

Window frame 14 of the vehicle door 12 has an upwardly curved portion 44 extending horizontally for the width of the door. The hook portions 36 and 42 of plates 28, may be engaged with inwardly curved portion 44 of the door frame, so that the arm rest may be supported thereby, as illustrated in Figures 1 through 3. Window engaging clips 46 are connected to the backing 18 at about the medial portion thereof. The window clip is of generally channel shape having a bight portion 48, and outwardly curved leg portions 50. The bight portion 48 has a small slot 52 formed on one end thereof, and a longer slot 54 formed on the other end. Two buttons 56 will be fastened to the backing 18 at about the point where clip 46 is to be attached. These buttons 56 have projecting teeth 58, which may be inserted into the backing and then bent as at 60, to hold the button firmly into the backing 18. The pair of buttons 56 are slightly spaced from each other, and are spaced apart a distance less than the length of the bight portion 48 of clip 46. The clip 46 may be detachably connected to the buttons, by first sliding one of the buttons into elongated slot 54, and then reversing the direction of clip 46 and inserting the other button into slot 52, whereby the clip 46 will be held in position by the two buttons. In use, the clips 46 would be disposed about the top edge of a window 62, so as to properly align the arm rest with respect to the window frame 14.

When the arm rest is in the position illustrated in Figure 1, the upper edge of the arm rest will be disposed below the permanent arm rest 64 which is a part of standard automobile doors. At the lower end of back 18, an elastic pocket 66 is attached, as by stitching or any other suitable means, so that articles may be placed therein for the convenience of passengers.

In warm weather, when it is usual to open the windows of a vehicle while driving, the window frame 14 usually becomes warm from the sun, and therefore passenger and motorists cannot place their arms thereon without being burned. Therefore, the arm rest may be used, and the arm placed thereon so that it will be protected from the hot window frame 14, and will be comfortably supported by the arm rest.

It may now be seen that I have herein shown and described a new and improved type of arm rest for vehicles.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the invention as claimed.

What is claimed as new is as follows:

1. An arm rest for vehicles comprising a flexible, resilient body having a continous surface on one side thereof, connecting means on said body for detachably fastening said body to the door of a vehicle, clip means on said body selectively engageable with the edge of a window, said connecting means including yieldable straps detachably fastened to said body having fasteners on one end thereof, said fasteners being in the form of flat plates having their ends bent to form an open hook for attachment to the door of a vehicle, one of said plates having a plurality of projections forming the open hook, another of said plates having a plurality of notches formed in the open hook in alignment with said projections whereby one said plate and another said plate may be detachably fastened together to form a loop.

2. A cushioning support pad comprising a flexible, resilient body having a flat continuous pliable sheet material backing member and the underside thereof, connecting means on said body for detachably fastening said body in a position of use, clips on the underside of said body and intermediate the ends thereof for resiliently attaching said body at its midportion to the bottom edge of a vehicle window opening, said connecting means comprising a pair of longitudinally yieldable laterally spaced straps each having one end secured to said body adjacent one edge of the latter, a fastener on the other end of each strap comprising flat plates having hook means on one edge of each fastener for attachment to the door of a vehicle, the hook means of the two fasteners being staggered relative to each for interdigitated engagement whereby when the plates are connected together their straps will form a supporting loop for said body.

3. The combination of claim 2 including a pocket formed in said backing member.

4. The combination of claim 1 wherein said body has a flat continuous pliable sheet backing member secured to the underside thereof, a pocket formed in said backing member.

5. The combination of claim 4 wherein said straps are detachably connected to said body and to said backing sheet.

References Cited in the file of this patent
UNITED STATES PATENTS

| | | |
|---|---|---|
| 1,616,009 | Turner | Feb. 1, 1927 |
| 2,715,544 | Jones | Aug. 16, 1955 |
| 2,760,788 | Segall | Aug. 28, 1956 |
| 2,803,493 | Haefliger | Aug. 20, 1957 |